(No Model.) 2 Sheets—Sheet 2.
C. P. F. CLERC & A. G. PINGAULT.
ELECTRIC ACCUMULATOR.
No. 595,695. Patented Dec. 21, 1897.
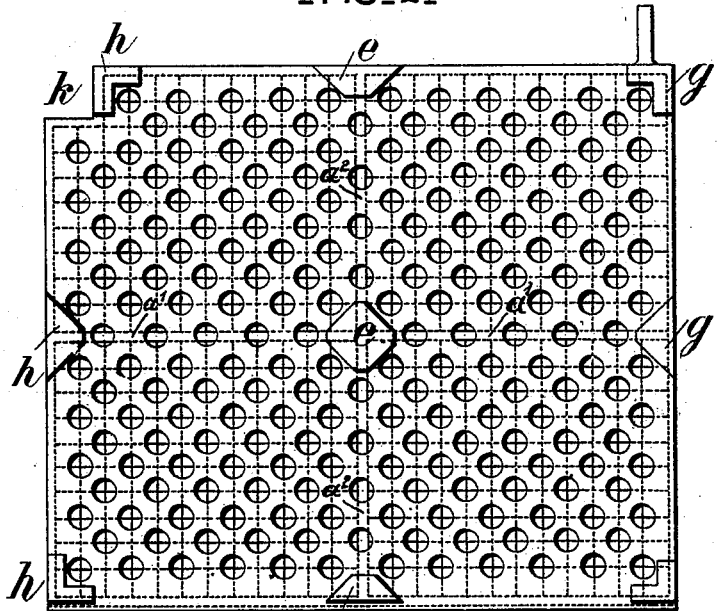
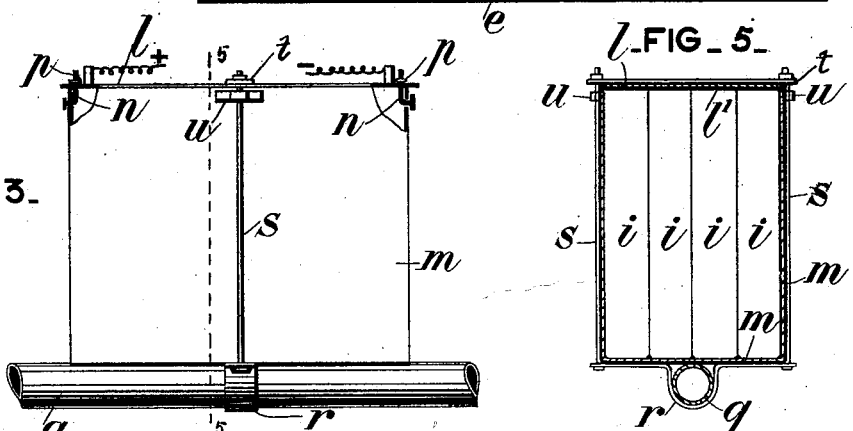
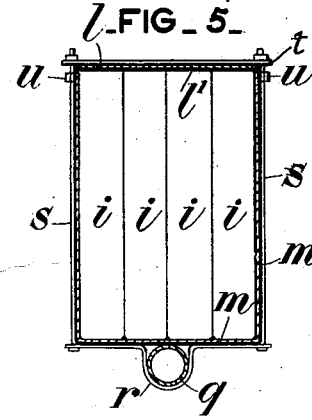
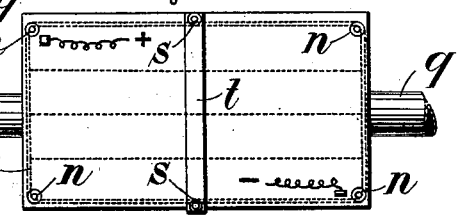
Witnesses:—
Inventors:—
Clovis Pierre Francis Clerc
Adolphe Georges Pingault

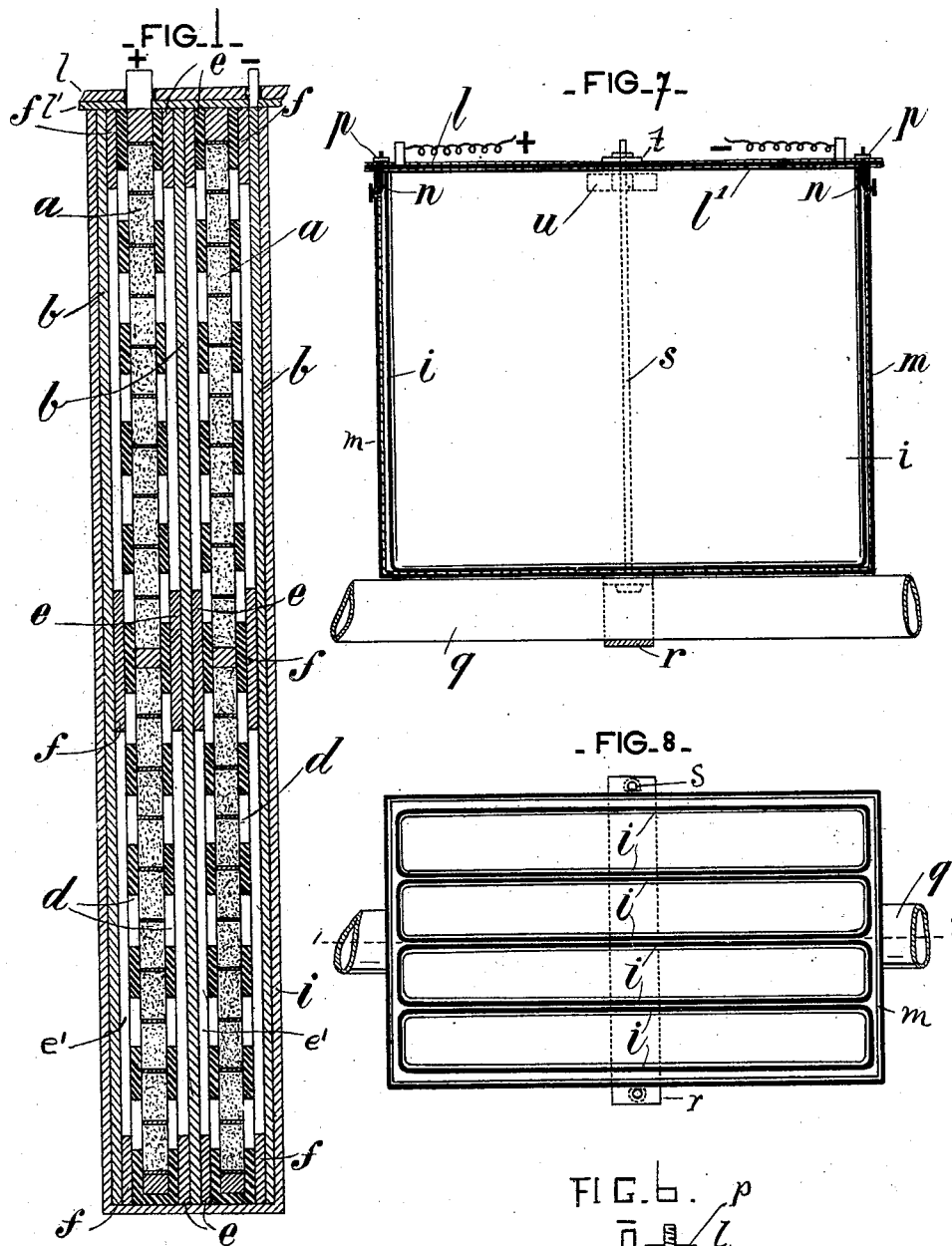

United States Patent Office.

CLOVIS PIERRE FRANCIS CLERC AND ADOLPHE GEORGES PINGAULT, OF PARIS, FRANCE.

ELECTRIC ACCUMULATOR.

SPECIFICATION forming part of Letters Patent No. 595,695, dated December 21, 1897.

Application filed December 5, 1896. Serial No. 614,535. (No model.) Patented in Belgium August 8, 1896, No. 122,957.

*To all whom it may concern:*

Be it known that we, CLOVIS PIERRE FRANCIS CLERC, gentleman, residing at 28 Rue Grange Bateliere, and ADOLPHE GEORGES PINGAULT, electrician, residing at 98 Rue du Chemin-Vert, Paris, France, citizens of the Republic of France, have invented certain new and useful Improvements in Electric Accumulators, (for which we have obtained Letters Patent of Belgium, No. 122,957, dated August 8, 1896,) of which the following is a specification.

Our invention relates to improvements in the construction of electrical accumulators, and especially of those intended for propelling cycles of all kinds.

Figure 1 shows a vertical cross-section of an accumulator-cell. Fig. 2 is a view in elevation of a negative plate with its covering. Fig. 3 is a side view of the accumulator-casing mounted on a tube. Fig. 4 is a plan view of Fig. 3. Fig. 5 is a partial cross-section on line 5 5 of Fig. 3, the cells being left in elevation. Fig. 6 is an enlarged section of a detail. Fig. 7 is a section on line 7 7 of Fig. 8; and Fig. 8 is a plan of the cells and casing secured to a tube, the contents of the cells being omitted.

Each section of the accumulator has any desired number of plates, that shown in Fig. 1 having three positive zinc plates $b$, between which are arranged two negative plates $a$, of lead, perforated with holes, which holes are filled with pastelles of lead oxid. Each plate $a$ is made of a checkered sheet of lead, as shown by dotted lines in Fig. 2. The plate may be reinforced by cross-ribs $a'$ $a^2$. These ribs are, however, not essential and are omitted in the cross-section, Fig. 1. Each plate $a$ is provided with a non-conductive sheet or covering $d$, which covers the sides and bottoms of said plates. The sheet $d$ is perforated in the parts along the sides of plate $a$, the perforations being smaller than the oxid pastelles, so that should the latter become loosened from their plate they will be retained in the covering and will not come in contact with the plates $b$. When plates $a$ and said coverings are raised from cells $i$, such detached oxid will be removed without the necessity of removing the liquid from the cell. Sheet $d$ is of caoutchouc celluloid or of some material non-conductive of electricity and which will not be attacked by the liquid used.

In order to keep the plates $a$ $b$ sufficiently apart, blocks or separators $e$ $g$ $h$ are fixed at suitable distances apart to covering $d$, Figs. 1 and 2, thus leaving spaces $e'$.

The plate-coverings are inclosed in the boxes or cells $i$ of caoutchouc celluloid or other suitable material, the plates having the same height as the interior of box $i$. The plates are cut away at $k$, preferably at a corner, in order to give space for the connection of plates of the same sign within box $i$.

To secure the accumulator upon a bicycle, several cells are inclosed in a light case $m$, of sheet-steel, fixed upon the lower horizontal tube $g$ of the framing by bolts $s$, clamp $r$, and cross-bar $t$. The case is closed by a cover $l$, of steel, traversed near its corners by four screw-threaded rods $n$, (see Figs. 3 and 6,) fixed to the case as tangential spokes are fixed in hubs, the heads of these rods being soldered to the case. The cover is secured by four nuts $m'$. The accumulator-terminals $+$ $-$ extend through the cover, being insulated therefrom. Just below cover $l$ is a caoutchouc or similar sheet $l'$. The cover and said sheet not only close casing $m$, but also hermetically close the several cells $i$, and by pressing on the ends of the plates therein hold them in place.

In charging the accumulator we may place negative plates $a$ and lead plates similar in size and shape to plates $b$ in cells $i$, with a suitable liquid, as dilute sulfuric acid, and pass a current therethrough in the usual manner. When the accumulator is charged, the lead plates and the liquid may be withdrawn. When the cell is to be discharged, an electrolyte of dilute sulfuric acid will be placed in the cells and zinc plates $b$ will be substituted for the removed lead plates, since this gives a higher electromotive force and a diminution of weight to the discharging-accumulator.

We claim—

In an electric accumulator, the combination of plates *a* carrying active material, perforated non-conductive coverings *d* surrounding plates *a* on their sides and bottoms, whereby when plates *a* and coverings *d* are lifted out any active material which may have become loosened from the plates will be taken out also, an insulating-cell *i* inclosing said parts, an inclosing case *m* having a cover *l*, a caoutchouc or similar sheet on the lower side of the cover, said sheet and cover pressing against the end of said cell *i* and forming a cover for it also.

Signed at Paris, France, this 23d day of November, 1896.

CLOVIS PIERRE FRANCIS CLERC.
ADOLPHE GEORGES PINGAULT.

Witnesses:
ABEL JULIEN,
EDWARD P. MacLEAN.